A. N. HANNA.
AUTOMATIC WAGON BRAKE.
APPLICATION FILED SEPT. 4, 1909.
989,253.
Patented Apr. 11, 1911.
2 SHEETS—SHEET 2.
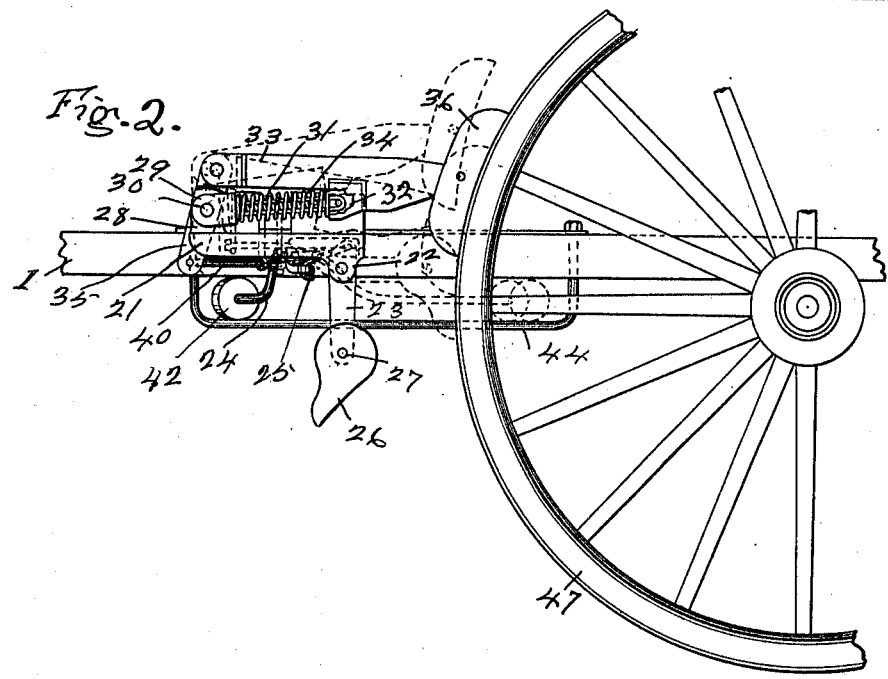
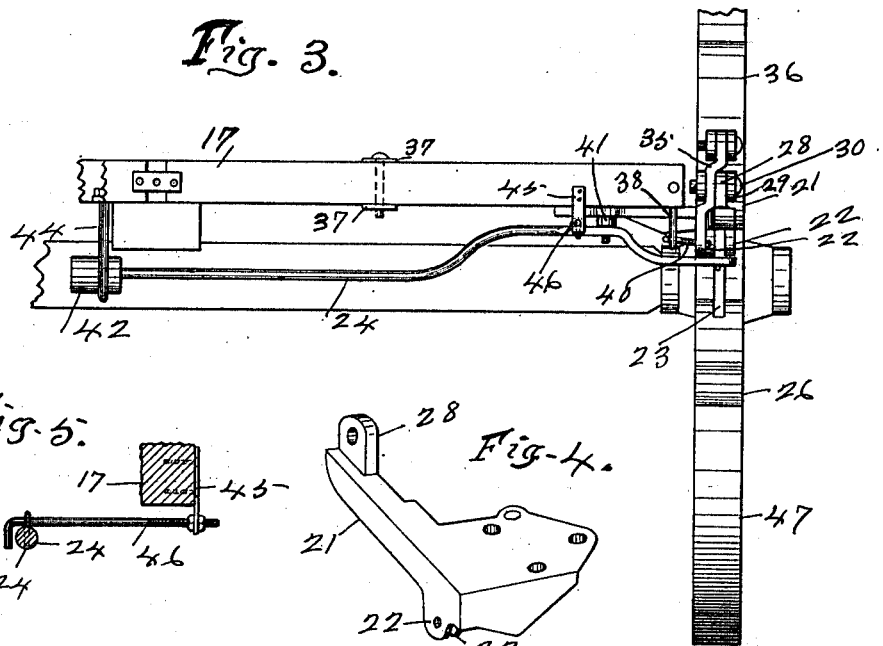
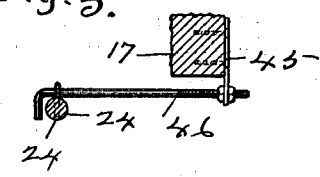
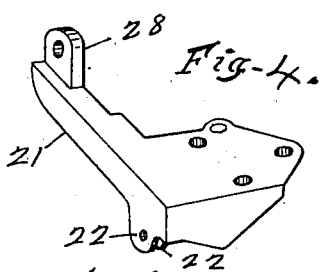

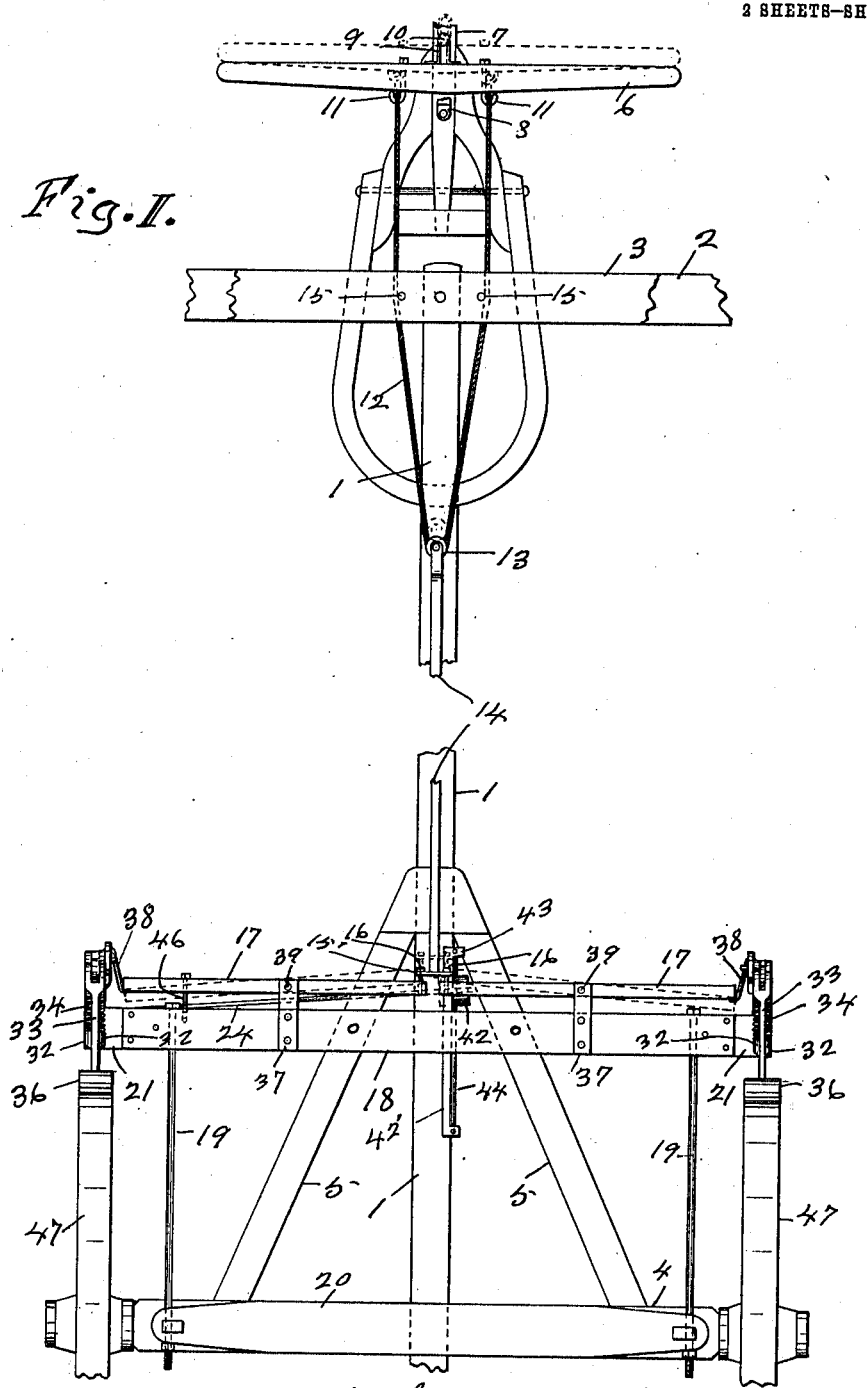

UNITED STATES PATENT OFFICE.

ARCHIBALD N. HANNA, OF FORT WAYNE, INDIANA.

AUTOMATIC WAGON-BRAKE.

989,253.

Specification of Letters Patent. Patented Apr. 11, 1911.

Application filed September 4, 1909. Serial No. 516,242.

*To all whom it may concern:*

Be it known that I, ARCHIBALD N. HANNA, a citizen of the United States, residing at Fort Wayne, in the county of Allen, in the State of Indiana, have invented certain new and useful Improvements in Automatic Wagon - Brakes; and I do hereby declare that the following is a full, clear, and exact description of the invention, which will enable others skilled in the art to which it appertains to make and use the same, reference being had to the accompanying drawings, which form part of this specification.

My invention relates to improvements in automatic wagon brakes.

The object of my present invention is to provide a comparatively cheap, simple, efficient and reliable wagon brake so constructed and arranged as to exert its holding power automatically upon the rear wheels of a vehicle approximately proportional to the load and grade, and also adapted to automatically lock the vehicle against a retrograde movement upon an incline when desired in the ascent thereof.

My invention consists of a pair of companion brakes in coöperative relation with the rear wheels; means for applying the brakes to the rear wheels with varying power; means for automatically releasing the brakes, and for returning them to their normal position; means for automatically locking the vehicle against a retrograde movement upon an incline; means for preventing the uphill brake mechanism from coming into action on an upgrade; and means for permitting a free swinging movement of the front axle and of the double-tree without any derangement of or interference with the brake actuating means.

The principal novel features of my invention are the coöperative means for applying the brakes; the means for automatically returning the brake mechanism to its normal position; the means for actuating the uphill brake mechanism; and the means for securing the uphill brake from going into action when the team is not pulling.

Similar reference numerals indicate like parts throughout the several views of the drawings in which—

Figure 1 is a plan view of my invention in position upon a vehicle running gear, shown in a fragmentary view, the invention being partly broken away near its central portion. Fig. 2 is an enlarged detail end view of the brake mechanism in position, and showing its coöperative relation with one of the rear wheels, shown in a fragmentary view, the brake shoes being shown in different positions by dotted outline. Fig. 3 is a front side view of a portion of the brake mechanism, showing the relative arrangement of the uphill brake. Fig. 4 is a perspective detail of one of the brake beam castings. Fig. 5 is a detail of the means for securing the brake shoe 26 out of action in backing the wagon on level ground.

The forward end of the reach 1 is pivotally secured between the axle 2 and the sand-board 3 in the usual manner, and the rear end of the reach is properly connected with the rear axle 4 and the hounds 5. A double-tree 6 is slidably mounted on the tongue 7 beneath the usual hammer strap 8 partly broken away, Fig. 1. To the front edge of the swingle-tree 6 midway of its ends is rigidly fixed a horizontally arranged loop 9 which engages the fixed pin 10 in the tongue 7 which thereby limits the lateral play of the double-tree and also prevents its longitudinal derangement. To the rear edge of the double-tree 6 equidistant from opposite ends thereof are fixed the hooks 11 to which are secured the opposite ends respectively of the cable 12 whose looped end is loosely mounted on the idler 13 in the forward end of the rod 14 which is arranged directly above the reach 1. The forward ends of the cable 12 are maintained in proper relation by bearing against the outer face of the vertical pins 15 which have one end fixed in the forward axle 2 and the other end fixed in the sand-board 3. The rear end of the rod 14 has a short horizontal plate 15′ fixed thereon having a bolt hole in each end thereof for the screw-bolts 16 whose rear ends are fixed in the inner adjacent ends of the brake-levers 17 about to be described.

At a suitable point on the hounds 5 is rigidly bolted the transverse brake-beam 18 whose rigidity is secured by the parallel brace rods 19 having one end firmly secured in the bolster 20 and the other end in the beam 18 near its opposite ends.

To the ends of the brake-beam 18 and to the lower face thereof are rigidly fixed the casting 21, Figs. 2 and 4, on which the respective brake-shoes and their supporting arms are mounted. The casting 21 has at its rear end the apertured pendant ears 22 between which is pivotally mounted one end of the short arm 23 whose upper end is pivotally connected to the adjacent outer end of the transversely arranged rod 24 by means of the connecting link 25. The body of the casting 21 is also vertically slotted upon its lower face forwardly of the lugs 22 to permit the forward movement of the upper end of the arm 23. To the outer end of the arm 23 is pivotally mounted a pear-shaped brake-shoe 26 by means of the fulcrum pin 27, Fig. 2. The forward end of the casting 21 has an upright apertured lug 28 to which the bifurcated forward end of the arm 29 is pivotally secured by the pivot 30. The rear and greater portion of the arm 29 consists of a fixed loop 31 whose loop end is secured between the pendant lugs 32 of the rearwardly extended overhanging arm 33 about to be described.

On the loop portion 31 of the arm 29 is loosely mounted the coiled spring 34, one end of which bears against the bifurcated portion thereof, and the other end of which bears against the lugs 32 of the arm 33. The forward bifurcated end of the arm 33 is pivotally secured to the upper end of the upright lever 35 which is pivoted substantially midway of its ends on the pivot 30, and preferably adjacent to the lug 28. On the rear end of the arm 33 is pivotally mounted the brake shoe 36 of any proper form.

At suitable points on the brake-beam 18 and upon the upper and lower faces thereof are fixed the forwardly extended plates 37, between whose extended ends are pivotally fulcrumed the brake-levers 17 respectively midway of their ends on the pivots 39. The outer ends of the levers 17 are provided with the pendant rods 38 whose apertured lower ends are pivotally connected with the lower apertured ends of the respective levers 35 by means of the links 40.

On the lower face of the casting 21, near its inner end is arranged a pendant stud 41 on which is pivotally fulcrumed the transversely arranged lever 24 whose outer end is pivotally connected to the arm 23 by the link 25, as before described, and whose inner end is provided with a loosely mounted roller 42.

Near one edge of the reach 1 and resting thereon in longitudinal arrangement is a plate 42' which is fixed near the middle of its length to the bottom of the brake beam 18, and which has its ends provided with the lateral apertured lugs 43, Fig. 1, in which are fixed the opposite upturned ends respectively of the pendant rod 44 which forms a track-way for the roller 42. Near the other end of the brake-levers and upon the front edge thereof are fixed the pendant plates 45 in the lower end of which are fixed the outer end of the rods 46 whose rear end has a hook which loosely embraces the rod 24 when the outer ends of the brake-levers are at their forward limit and serves the function of preventing the uphill brake from coming into action when the team is not pulling upon the swingle-tree. I preferably employ but one uphill brake, and of course, only one rod 24 and one roller 42.

The operation and manner of employing my invention thus described is obvious, and briefly stated is as follows: When there is a sufficient draft upon the double-tree to draw the vehicle, the double-tree will be drawn forward to the position shown by dotted outline in Fig. 1, thereby drawing the inner ends of the brake levers 17 slightly forward as shown in dotted lines, through the medium of the cable 12 and the rod 14. This lateral movement of the brake-levers elevates the brake shoes out of contact with the perimeter of the wheel, as shown in Fig. 2, by their connection with the lower ends of the levers 35 through the medium of the links 40. When relieved of the draft thereon the double-tree with its described connecting means will automatically resume its normal position through the action of gravity upon the brake shoes which descend to their normal position by their own weight, in which position they engage the perimeter of the rear wheels 47. The weight of the load in descending an incline forces the brake shoes downward to their lowest limit, as shown by dotted lines in Fig. 2, in which position the inner ends of the brake-shoe levers 33 rest upon the upper face of the castings 21 at their rear end, and pressure of the wheels upon the brake-shoes is resisted by the tension of the coiled springs 34. As these coiled springs are mounted on the arms 29 which in turn are fulcrumed on the fixed pivot 30, it is evident that the power exerted by the brakes is dependent upon or controlled by the coiled springs, and that the power exerted by the brake is approximately proportional to the weight of the load. As the cable 12 passes over the guide pins 15 and over the idler 13 any swinging motion of the double-tree in the turning of the vehicle will have no effect upon the brake actuating means or connections.

The operation of the uphill brake is as follows: The brake shoe 26 is so suspended as to normally hang in the position shown in full lines in Fig. 2, with the roller 42 resting in the forward end of the track-way 44. When the vehicle starts to ascend an incline the roller 42 will seek to descend by gravity to the other end of the track-way carrying the shoe 26 rearwardly with the upper end against the perimeter of the wheel which in such position is inactive. The rearward motion of the wheel will swing the shoe into holding position with its flat face against the wheel as seen in dotted lines in Fig. 2. When the vehicle is given a backward motion the brake-levers 17 have their outer ends forced outwardly and thereby engage the rod 24 by the hook on the inner end of the rod 46, and thus prevents the roller 42 from rolling back on its trackway, and thereby prevents the shoe 26 from coming into contact with the wheel.

Having thus described my invention and the manner of employing the same, what I desire to secure by Letters Patent is:

1. In an automatic wagon brake a movable double tree, a pivotally mounted arm carrying a brake shoe in coöperative relation with the perimeter of the rear wheel, means operatively connecting the double tree and arm, means for normally throwing the brake shoe out of action when the double tree moves in one direction, and a spring connected at one extremity to the arm and operative beneath and in the plane of the same to oppose the operation thereof in action.

2. In an automatic wagon brake a movable double tree, a movable fulcrum operatively connected to the double tree, an arm pivotally mounted on the fulcrum and carrying a pivotally mounted brake shoe in coöperative relation with the rear wheel, and a spring connected at one end to the arm and at its other end to the fulcrum, the spring being operative in the plane of the arm to oppose the brake shoe in action.

3. In an automatic wagon brake, a laterally slidable double tree, a plurality of down hill brake shoes adapted to engage the rear wheels of the vehicle, a flexible connection between the double tree and the brake shoes, the connection being so arranged that as the double tree is actuated in one direction the brake shoes are simultaneously elevated from the wheels, auxiliary means operative to oppose the brake shoes in action, an up-hill brake to lock the vehicle against a retrograde movement, means for automatically bringing the last named brake into action and means carried by the connection between the down hill brake and the double tree for automatically retaining the down hill brake out of action during a backward movement of the vehicle.

4. In an automatic wagon brake a supporting casting; an arm pivoted at one end to a movable fulcrum on the casting and carrying upon its other end a pivoted brake shoe in coöperative relation with the perimeter of the rear wheel, the fulcrum of the brake shoe maintaining at all times a fixed relation to the movable fulcrum, means for normally maintaining the said arm in an uplifted position to secure the brake shoe out of action, said means permitting the brake shoe to come into action by gravity, and means for causing the brake to exert a holding power approximately proportional to the weight of the load.

5. In a wagon brake mechanism means for automatically locking the vehicle against a retrograde movement upon an incline, comprising a supporting casting, a lever mounted on the casting, a brake shoe pivotally connected to one arm of the lever in coöperative relation with the rear wheel and below the plane of its axial center, a horizontal pendent trackway below the reach, a roller mounted on one end of a transversely extending rod and movable on the trackway, the other end of the rod being pivotally connected to said lever.

6. In an automatic wagon brake a supporting casting, a vertically arranged lever arm fulcrumed on said casting midway of its ends, a brake lever pivotally connected to the lower end of the lever arm, a rearwardly extended arm pivoted to the upper end of the lever arm at one end, and carrying upon its free end a pivotally mounted brake shoe, and means between the supporting casting and the rearwardly extended arm for automatically controlling the holding power of the brake in proportion to the load.

7. In an automatic wagon brake mechanism a movable double tree, a pivotally mounted down hill brake, a brake lever operatively connected to the brake and to the double tree, an up-hill brake shoe pivotally suspended from a proper support in coöperative relation with the rear wheel and below the plane of the axial center of the wheel, an actuating rod operatively connected to the brake shoe and having a roller mounted thereon, a trackway on which the roller is movable and means on the brake lever for automatically retaining the up hill brake out of action during a backward movement of the vehicle.

Signed by me at Fort Wayne, Allen county, State of Indiana, this 2nd day of September, 1909.

ARCHIBALD N. HANNA.

Witnesses:
 AUGUSTA VIBERG,
 WATTS P. DENNY.